United States Patent
Arad

(10) Patent No.: US 8,730,967 B1
(45) Date of Patent: May 20, 2014

(54) POLICY-BASED VIRTUAL ROUTING AND FORWARDING (VRF) ASSIGNMENT

(75) Inventor: Nir Arad, Nesher (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 113 days.

(21) Appl. No.: 13/346,533

(22) Filed: Jan. 9, 2012

Related U.S. Application Data

(63) Continuation of application No. 12/170,353, filed on Jul. 9, 2008, now Pat. No. 8,094,659.

(60) Provisional application No. 60/948,596, filed on Jul. 9, 2007.

(51) Int. Cl.
*H04L 12/28* (2006.01)

(52) U.S. Cl.
USPC .......................................... 370/392; 370/389

(58) Field of Classification Search
None
See application file for complete search history.

(56) References Cited

U.S. PATENT DOCUMENTS

| | | | |
|---|---|---|---|
| 6,654,779 B1 | 11/2003 | Tsuei | |
| 7,522,604 B2* | 4/2009 | Hussain et al. | 370/392 |
| 8,094,659 B1 | 1/2012 | Arad | |
| 2001/0007560 A1 | 7/2001 | Masuda et al. | |
| 2002/0126672 A1 | 9/2002 | Chow et al. | |
| 2002/0145981 A1 | 10/2002 | Klinker et al. | |
| 2003/0223361 A1* | 12/2003 | Hussain et al. | 370/230 |
| 2007/0171911 A1 | 7/2007 | Ku | |
| 2008/0175241 A1* | 7/2008 | Kalampoukas et al. | 370/392 |

* cited by examiner

*Primary Examiner* — David Oveissi

(57) ABSTRACT

A network switch device includes network interfaces configured to receive and transmit packet based communications within a computer network, a virtual router classification engine, and a packet forwarding engine. The virtual router classification engine is configured to generate a search key for a packet received at a first network interface using header information, and additional information associated with the packet, to select a rule corresponding to the generated search key, and to apply an action associated with the selected rule to the packet. The virtual router classification engine is configured to apply an action associated with the selected rule to the packet at least by assigning a virtual router identifier to the packet. The packet forwarding engine is configured to serve organizations forming the computer network, and segregate packet communications of the first organization from packet communications traffic of other organizations based on the assigned virtual router identifier.

18 Claims, 4 Drawing Sheets

POLICY-BASED VIRTUAL ROUTING AND FORWARDING (VRF) ASSIGNMENT

CROSS-REFERENCE TO RELATED APPLICATIONS

The present application is a continuation application of U.S. application Ser. No. 12/170,353, now U.S. Pat. No. 8,094,659, entitled "POLICY-BASED VIRTUAL ROUTING AND FORWARDING (VRF) ASSIGNMENT," filed on Jul. 9, 2008, which claims the benefit of priority to previously filed U.S. provisional patent application Ser. No. 60/948,596, filed Jul. 9, 2007, entitled "Policy-based VRF Assignment." The above-referenced applications are hereby incorporated by reference herein in their entireties.

BACKGROUND

1. Field of the Disclosure

The present disclosure relates generally to routers in computer networks, and more particularly to a method of increasing resolution of virtual router assignment.

2. Description of Related Art

Routers are used to forward IP traffic in computer networks. To prevent information leaks, an Internet service provider may need to segregate traffic of different customers, and an enterprise may want to segregate traffic of different groups. Virtual routing and forwarding (VRF) may be used for such traffic segregation. VRF is a technology which allows several virtual routers to exist in one Internet router and work simultaneously.

FIG. 1 illustrates a simplified example of a part of a computer network of an enterprise. The enterprise may have multiple groups, e.g., groups BLUE, RED and GREEN. As shown, the computer network may have a number of VLANs (virtual LANs), and each of the VLANs may be used for network traffic among hosts belonging to one group, e.g., a blue VLAN 101b for the group BLUE, a red VLAN 101r for the group RED, and a green VLAN 101g for the group GREEN. The blue VLAN 101b may have hosts 1b, 2b, 3b and 4b belonging to the group BLUE, the red VLAN 101r may have hosts 1r and 2r belonging to the group RED, and the green VLAN 101g may have hosts 1g and 2g belonging to the group GREEN. A router 102 may contain a number of virtual routers, e.g., virtual routers B, R and G. Each virtual router may be identified by a VRF-ID (a pointer to address spaces in a routing table), and may function according to its own routing table, thus separating traffic of different groups of the enterprise. The currently available technology makes VRF assignment at layer 2 of the Internet Protocol and identifies virtual routers with port, VLAN tag or MPLS (Multiprotocol Label Switching) tunnel interface of a packet.

An enterprise may want to further segregate traffic between hosts in one VLAN, and sometimes may want to allow a host in one group (or VLAN) to communicate with a host in another group (or VLAN). For example, in the computer network shown in FIG. 1, hosts 1b and 2b may be workstations, and hosts 3b and 4b may be IP phones. The enterprise may want to separate workstation traffic from IP phone traffic, separate the traffic of the group BLUE from the traffic of the group GREEN, but allow traffic between workstation hosts 1b and 2b in the group BLUE and hosts 1r and 2r in the group RED. Theoretically, the currently available technology may accomplish this by using a table to define the segregation policies between hosts pair by pair. But in practice, the table may increase greatly in size as the number of hosts in the VLANs increases. In addition, the table is not scalable and needs to be updated each time a host is added to one of the VLANs.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

Embodiments of the present invention provide a method for increasing resolution of virtual router assignments in a computer network. In accordance with an embodiment of the present invention, a virtual router makes assignments at layer 3 of TCP/IP (Transmission Control Protocol/Internet Protocol), the network layer. An incoming packet may be parsed to obtain its source and destination IP addresses. With the obtained IP addresses, and in some cases other information about the packet, a classification engine may perform a multi-field classification in a memory such as a TCAM (Ternary Content-Addressable Memory) or other suitable memory devices. The result may point to an action entry in an action table in a memory, e.g., an SRAM (Static random access memory). The action entry may indicate policy-based setting of a virtual router, and a VRF-ID. A virtual router may be assigned according to the VRF-ID. A group based classification in layer 3 of the Internet Protocol may avoid using a table to define segregation policies between hosts pair by pair.

Figure 1:
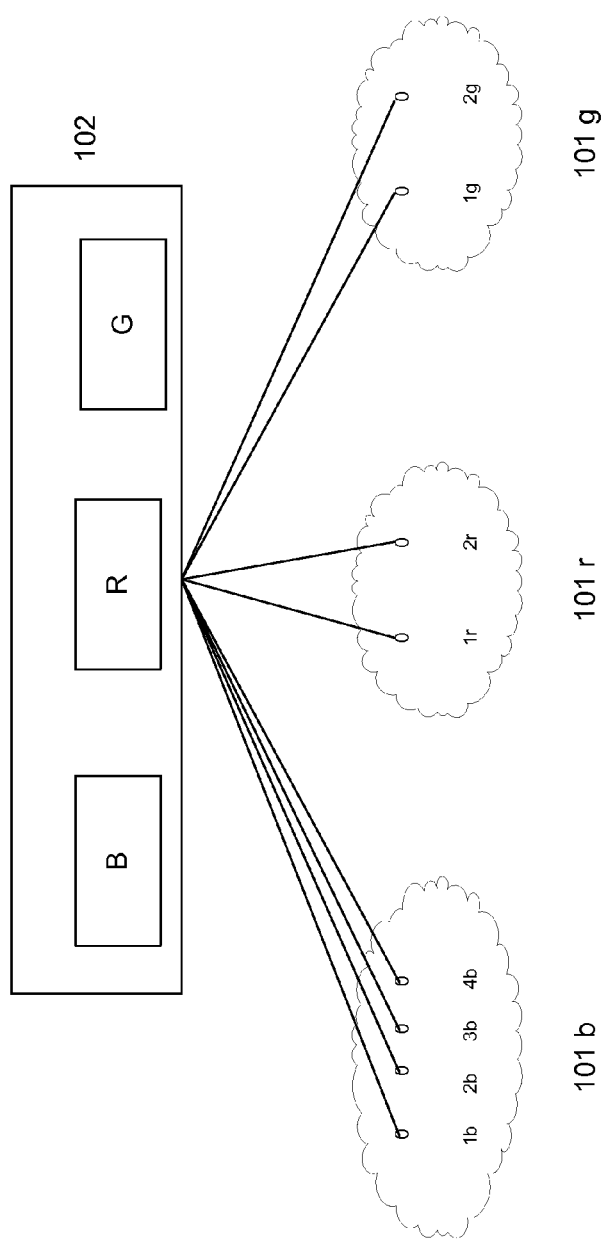
FIG. 1 illustrates a simplified example of a part of a computer network employing VRF.
Figure 2:
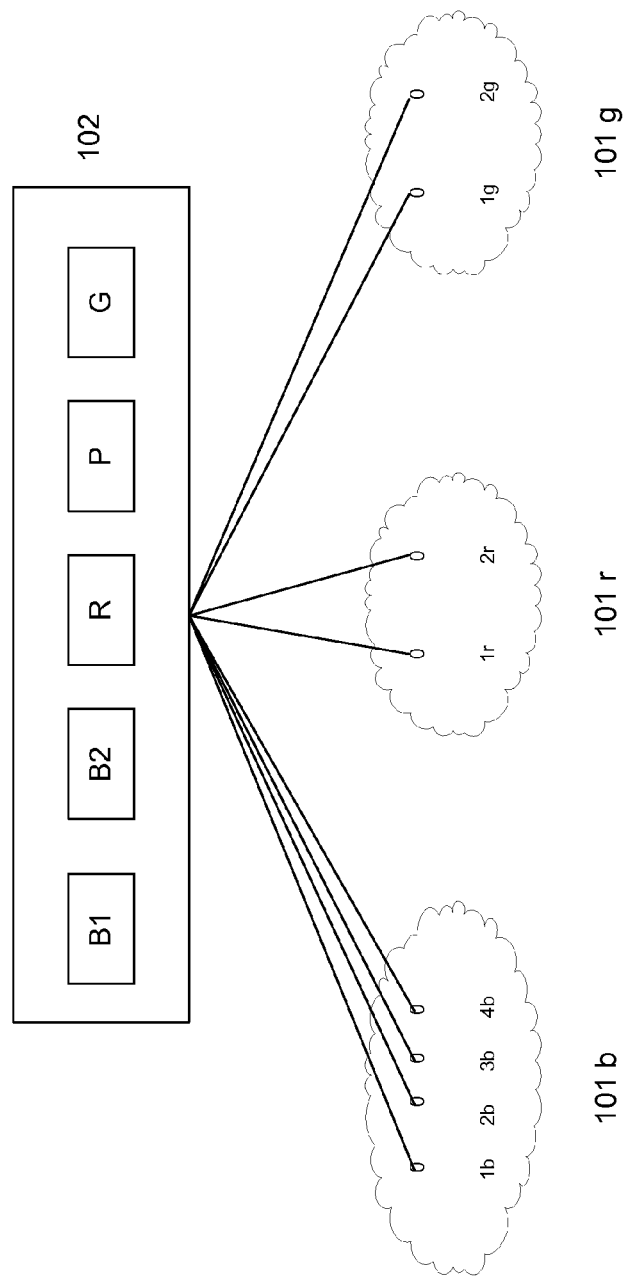
FIG. 2 illustrates a simplified example of a part of a computer network, in which the method of the present invention may be used.

FIG. 2 illustrates a simplified example of a part of a computer network, in accordance with an embodiment of the present invention. Similar to the computer network shown in FIG. 1, the computer network shown in FIG. 2 may have a blue VLAN 101b for the group BLUE, a red VLAN 101r for the group RED, and a green VLAN 101g for the group GREEN. The blue VLAN 101b may have hosts 1b, 2b, 3b and 4b, wherein hosts 1b and 2b may be workstations, and hosts 3b and 4b may be IP phones, for example. The red VLAN 101r may have hosts 1r and 2r, and the green VLAN 101g may have hosts 1g and 2g. The enterprise may want to separate workstation hosts 1b and 2b from IP phone hosts 3b and 4b, separate workstation hosts 1b and 2b in the group BLUE from the group GREEN, but allow traffic between workstation hosts 1b and 2b in the group BLUE and hosts 1r and 2r in the group RED.

In contrast to the computer network shown in FIG. 1, more virtual routers may be used to separate/enable traffic among groups BLUE, RED and GREEN in the computer network shown in FIG. 2. For example, in addition to the virtual router R for the group RED and the virtual router G for the group GREEN, a virtual router B1 may be used for workstation traffic in the group BLUE, a virtual router B2 may be used for IP phone traffic in the group BLUE, and a virtual router P may be used for traffic between workstation hosts 1b and 2b in the group BLUE and the hosts in the group RED.

Figure 3:
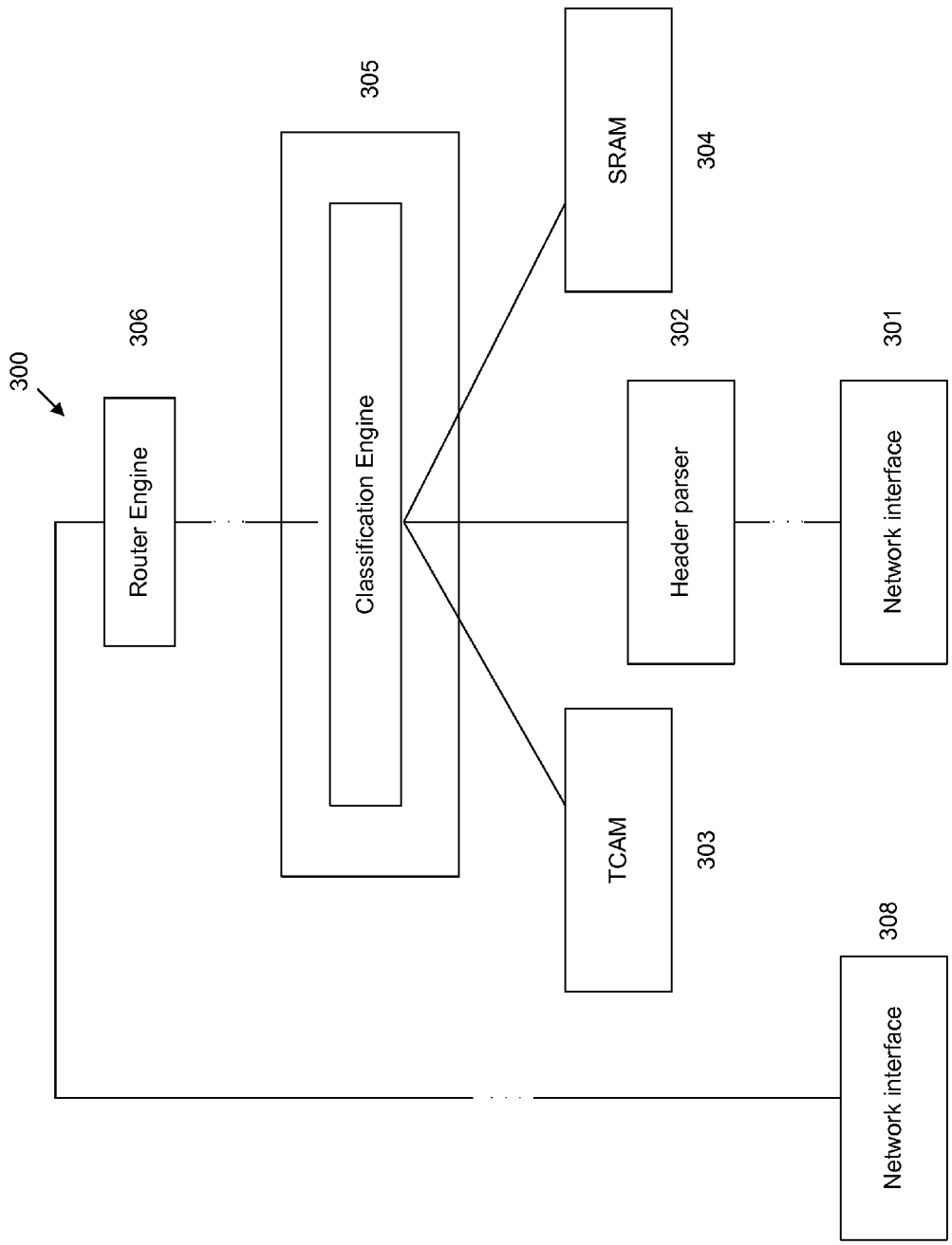
FIG. 3 illustrates a network architecture for VRF assignment according to one embodiment of the present invention.

FIG. 3 illustrates a switch 300 that utilizes VRF assignment according to one embodiment of the present invention.

The present invention uses the IP address of a packet to make the VRF assignment in layer 3 of the Internet Protocol. Accordingly, a header parser 302 may parse an incoming packet from a network interface 301 to obtain its source and destination IP addresses. The header parser may also obtain other information about the packet, e.g., the packet's source and destination MAC (Media Access Control) addresses, the packet's source and destination TCP (Transmission Control Protocol) or UDP (User Datagram Protocol) ports or the VLAN tag of the VLAN the packet is from.

A classification engine 305 may be placed anywhere between the header parser 302 and a router engine 306. The classification engine 305 may receive the source and destination IP addresses of the incoming packet from the header parser 302. The classification engine 305 may send the IP addresses to a memory such as a TCAM (Ternary Content-Addressable Memory) 304 or other suitable memory devices and perform a multi-field classification in the TCAM. The TCAM may keep information about hosts in the computer network, e.g., their IP addresses, MAC addresses, VLAN tags, and TCP or UDP ports. The TCAM may also store other information about the hosts, i.e., whether a host is a workstation host or an IP phone host. In one embodiment, a CAM (Content-Addressable Memory) or other classification method such as tree or hash based classification may be used for the multi-field classification. To improve the accuracy of the classification, in addition to the IP addresses of the packets, the multi-field classification may be performed together with other information about the packet, e.g., the packet's source and destination MAC addresses, its source and destination TCP or UDP ports, or the VLAN tag of the VLAN it is from. The fields may also include, e.g., source/destination network interface or port; Layer 3 protocol; 802.1p User Priority; IP-DSCP or MPLS-EXP fields; MPLS labels and their number; and Layer 4 protocol.

The classification engine 305 may hold a database of rules and an action table containing an action entry associated with each of the rules. The rules may be stored in one memory device, such as the TCAM 303, and the action table may be stored in another memory device, e.g., an SRAM 304.

A rule is a bit string generated from various packet header fields and/or the switch information (such as a packet ingress/egress port). A rule may represent a specific packet stream or an aggregation of streams. To represent an aggregation of streams, some bits in the rule may be set as, e.g., "Don't care." A rule for a specific stream may use exact value of all bits.

The classification engine 305 may perform a multi-field classification in the TCAM to find a rule matching the IP addresses of the incoming packet. The classification engine 305 may then access the action table in the SRAM 304 for an action entry associated with the rule. The action table may have a number of action entries. An action may instruct the switch 300 about what to do with a packet matching the rule, including but not limited to: discard/accept, forward to a specific network interface, assign VRF-ID or assign a service to the packet, such as guaranteed bandwidth, minimum delay. As a result, a VRF-ID may be assigned to the incoming packet and a virtual router may be assigned according to the VRF-ID. The router engine 306 utilizes the appropriate virtual router corresponding to the VRF-ID assigned to a packet to determine a network interface 308 via which the packet is to be transmitted, and the packet is forwarded to the network interface 308. If the classification engine 305 cannot find a matching action entry in the memory 304, the sender of the packet may be so informed. For example, when the incoming packet is a data packet from the host 1b to the host 2g, the host 1b may be informed that the transaction is not allowed, since the enterprise does not allow traffic between a host in the VLAN 101b and a host in the VLAN 101g.

Figure 4:
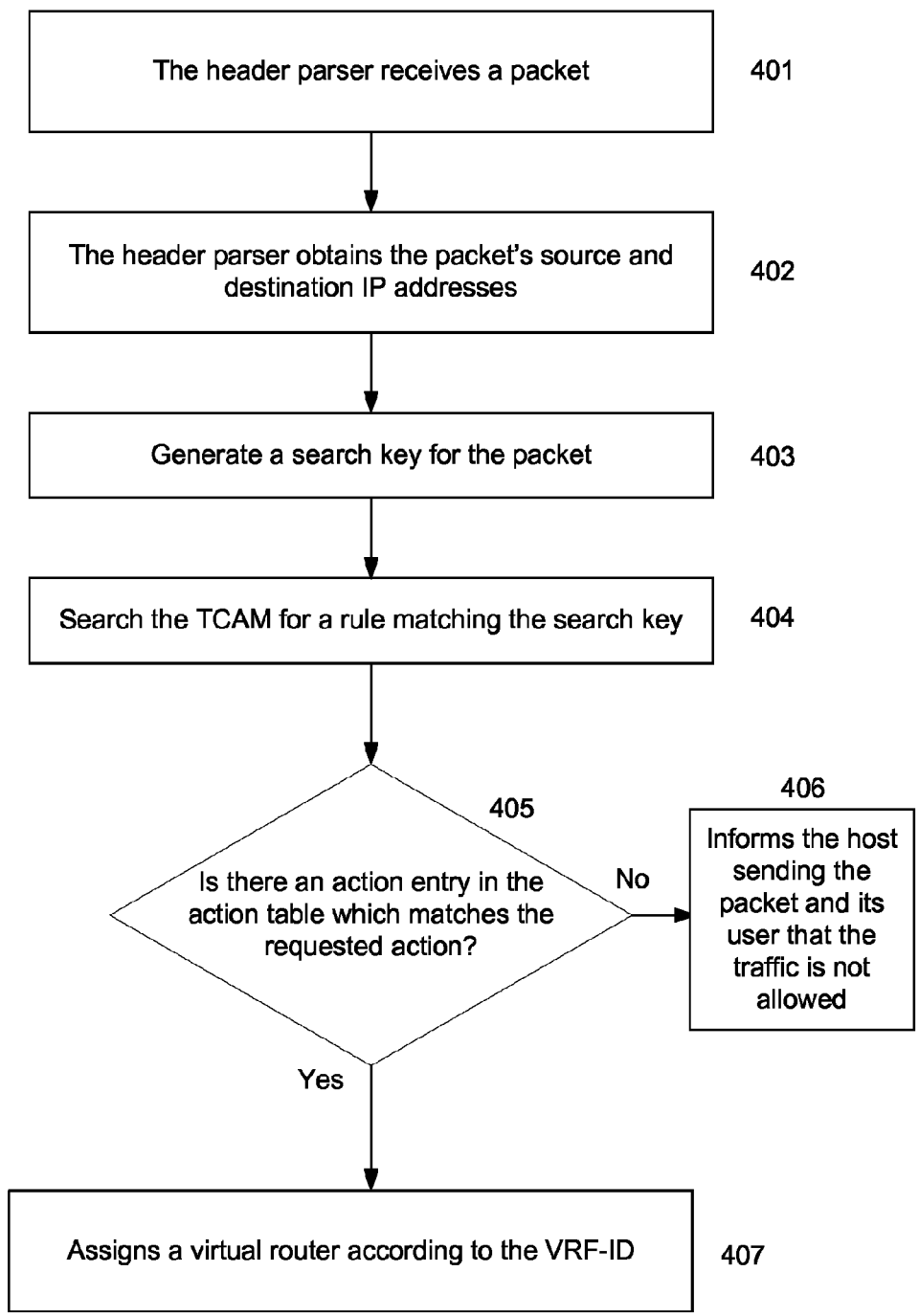
FIG. 4 illustrates a flow chart of a method for VRF assignment according to one embodiment of the present invention.

FIG. 4 illustrates a flow chart of a method for VRF assignment according to one embodiment of the present invention.

At 401, the header parser 302 may receive an incoming packet via the network interface 301.

At 402, the header parser 302 may parse the incoming packet to obtain its source and destination IP addresses. The header parser 302 may also obtain other information about the incoming packet, e.g., the packet's source and destination MAC addresses, the packet's source and destination TCP or UDP ports or the VLAN tag of the VLAN the packet is from.

From 403 to 405, the classification engine 305 may use the IP addresses of the incoming packet from the header parser 302 to perform a multi-field classification in the TCAM 303 and the SRAM 304. The multi-field classification may be performed together with other information about the packet, e.g., the packet's source and destination MAC addresses, the packet's source and destination TCP or UDP ports or the VLAN tag of the VLAN the packet is from. The result of the multi-field classification may be a VRF-ID assigned to the incoming packet.

Specifically, at 403, a search key may be generated for the incoming packet. The search key may be a bit string that includes relevant packet header fields, provided by the header parser 302 and switch information, such as the packet source port.

At 404, the search key may be matched against the rules in the TCAM 303, and the rule which is the most similar to the search key may be selected. The rule may point to an action entry in the SRAM 304.

At 405, an action entry in the SRAM 304, which is associated with the rule from the TCAM 303, may be accessed and applied to the packet. The action may be, e.g., assign VRF-ID. If the incoming packet is a data packet from the host 1b to the host 1r, the action requested by the incoming packet belongs to the traffic between workstation hosts in the VLAN 101b and hosts in the VLAN 101r, and the classification engine 401 may obtain the VRF-ID of the virtual router P.

If the incoming packet is a data packet from the host 1b to the host 1g, a matching action entry may not be found, since the enterprise does not allow traffic between hosts in the VLAN 101b and hosts in the VLAN 101g and there is no action entry for streams between hosts in the VLAN 101b and hosts in the VLAN 101g in the action table. Thus, no virtual router can be assigned, and the host 1b and its user may be so informed at 406.

At 407, in one embodiment, the virtual router P may be assigned to the incoming packet. Depending on the action requested by the incoming packet and each virtual router's permitted actions, any of virtual routers B1, B2, R or G may be assigned.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A network switch device for use in a computer network, the switch device comprising:

a plurality of network interfaces configured to receive and transmit packet based communications within a computer network, the plurality of network interfaces including a first network interface;

a virtual router classification engine configured to
generate a search key for a packet received at the first network interface using (i) header information obtained from one or more fields of a header of the packet and (ii) additional information associated with the packet,
select a rule corresponding to the generated search key, and
apply an action associated with the selected rule to the packet, wherein the virtual router classification engine is configured to apply an action associated with the selected rule to the packet at least by assigning a virtual router identifier to the packet; and a packet forwarding engine configured to (i) serve a plurality of organizations forming the computer network, the plurality of organizations including a first organization, and (ii) segregate packet communications within the network switch device of the first organization from packet communications traffic within the network switch device of other organizations in the plurality of organizations based on the virtual router identifier assigned by the virtual router classification engine.

2. The network switch device of claim 1, further comprising a first memory configured to store rules used to assign a plurality of virtual routers implemented in the network switch device, wherein the virtual routers are configured to segregate packet communications, and wherein the virtual router classification engine is configured to select the rule corresponding to the generated search key at least by accessing the first memory.

3. The network switch device of claim 2, wherein the first memory is a TCAM (Ternary Content-Addressable Memory).

4. The network switch device of claim 2, further comprising a second memory configured to store a plurality of action entries, wherein each of the plurality of action entries associates a rule to an action, and wherein the virtual router classification engine is configured to apply the action associated with the selected rule to the packet at least by accessing the second memory.

5. The network switch device of claim 1, wherein the packet forwarding engine comprises a router engine configured to (a) implement a plurality of virtual routers, (b) select one virtual router corresponding to the virtual router identifier assigned by the virtual router classification engine, and (c) use the one virtual router to determine that the packet is to be forwarded to a second network interface for transmission.

6. The network switch device of claim 1, wherein:
the header information includes one or both of (i) a source Internet Protocol (IP) address of the packet, and (ii) a destination IP address of the header of the packet; and
the additional information associated with the packet includes additional header information obtained from the one or more fields of the header of the packet, the additional header information including at least one type of additional information selected from the group consisting of
a source MAC (Media Access Control) address of the packet, a destination MAC address of the packet, a source TCP (Transmission Control Protocol) port of the packet, a destination TCP port of the packet, a source UDP (User Datagram Protocol) port of the packet, a destination UDP port of the packet, and a VLAN (Virtual Local Area Network) tag of a VLAN corresponding to the packet.

7. The network switch device of claim 1, wherein:
the header information includes one or both of (i) a source Internet Protocol (IP) address of the packet, and (ii) a destination IP address of the header of the packet; and
the additional information associated with the packet includes an indication of a port of the network switch device via which the packet ingressed.

8. The network switch device of claim 1, further comprising a header parser engine configured to obtain the header information.

9. The network switch device of claim 8, wherein the additional information associated with the packet includes additional header information associated with one or more additional fields of the header of the packet, and wherein the header parser engine is further configured to obtain the additional header information.

10. A method for forwarding a packet in a network switch device, the method comprising:
generating a search key, for a packet received at a first network interface of a plurality of network interfaces of the network switch device, using (i) header information obtained from one or more fields of a header of the packet and (ii) additional information associated with the packet;
selecting a rule corresponding to the generated search key;
applying an action associated with the selected rule to the packet, wherein applying an action associated with the selected rule to the packet includes assigning a virtual router identifier to the packet; and
segregating, within the network switch device and based on the assigned virtual router identifier, packet communications of a first organization in a plurality of organizations forming a computer network from packet communications traffic of other organizations in the plurality of organizations.

11. The method of claim 10, wherein selecting a rule corresponding to the generated search key comprises selecting a rule corresponding to the generated search key by accessing a first memory.

12. The method of claim 11, wherein selecting a rule corresponding to the generated search key comprises searching a TCAM (Ternary Content-Addressable Memory) using the generated search key.

13. The method of claim 11, wherein applying an action associated with the selected rule to the packet includes accessing an action table in a second memory.

14. The method of claim 10, wherein generating a search key includes generating the search key using:
one or both of (i) a source Internet Protocol (IP) address obtained from the one or more fields of the header of the packet and (ii) a destination IP address obtained from the one or more fields of the header of the packet; and
additional information associated with the packet that includes at least one type of additional information selected from the group consisting of
a source MAC (Media Access Control) address of the packet, a destination MAC address of the packet, a source TCP (Transmission Control Protocol) port of the packet, a destination TCP port of the packet, a source UDP (User Datagram Protocol) port of the packet, a destination UDP port of the packet, and a VLAN (Virtual Local Area Network) tag of a VLAN corresponding to the packet.

15. The method of claim 10, wherein generating a search key includes generating the search key using:
one or both of (i) a source Internet Protocol (IP) address obtained from the one or more fields of the header of the packet and (ii) a destination IP address obtained from the one or more fields of the header of the packet; and additional information associated with the packet that includes an indication of a port of the network switch device via which the packet ingressed.

16. The method of claim 10, wherein segregating packet communications of the first organization from packet communications traffic of other organizations comprises:

using one virtual router from a plurality of virtual routers to determine a second network interface of the switch device, wherein the one virtual router corresponds to the assigned virtual router identifier; and forwarding the packet to the second network interface for transmission.

17. The method of claim 10, wherein segregating packet communications of the first organization from packet communications traffic of other organizations comprises:

using a router engine configured to implement a plurality of virtual routers;

selecting one virtual router corresponding to the assigned virtual router identifier; and using the one virtual router to determine that the packet is to be forwarded to a second network interface for transmission.

18. A plurality of machine readable instructions stored on a non-transitory computer-readable medium, the plurality of machine readable instructions, when executed by a processor, causing the processor to:

generate a search key, for a packet received at a first network interface of a plurality of network interfaces of a network switch device, using (i) header information obtained from one or more fields of a header of the packet and (ii) additional information associated with the packet;

select a rule corresponding to the generated search key;

apply an action associated with the selected rule to the packet, wherein the instructions cause the processor to apply the action associated with the selected rule to the packet at least by assigning a virtual router identifier to the packet; and segregate, within the network switch device and based on the assigned virtual router identifier, packet communications of a first organization in a plurality of organizations forming a computer network from packet communications traffic of other organizations in the plurality of organizations.

* * * * *